United States Patent [19]
Allen et al.

[11] Patent Number: 5,665,278
[45] Date of Patent: Sep. 9, 1997

[54] AIRLESS QUENCH METHOD AND APPARATUS FOR MELTBLOWING

[75] Inventors: Martin A. Allen; John T. Fetcko, both of Dawsonville, Ga.

[73] Assignee: J & M Laboratories, Inc., Dawsonville, Ga.

[21] Appl. No.: 587,988

[22] Filed: Jan. 17, 1996

[51] Int. Cl.⁶ ............................................. B29C 47/88
[52] U.S. Cl. ..................... 264/6; 156/167; 264/12; 425/7; 425/10
[58] Field of Search ................... 264/6, 12, 115; 425/7, 10, 72.2; 156/167

[56] References Cited

U.S. PATENT DOCUMENTS

| | | | |
|---|---|---|---|
| 3,959,421 | 5/1976 | Weber et al. | 264/6 |
| 4,594,202 | 6/1986 | Pall et al. | 264/8 |
| 5,145,689 | 9/1992 | Allen et al. | 425/72.2 |

*Primary Examiner*—Mary Lynn Theisen
*Attorney, Agent, or Firm*—R. L. Graham

[57] ABSTRACT

Meltblown thermoplastic fibers are cooled by microsized water droplets produced by airless ruby nozzles. The droplets have an average diameter of less than 20 microns.

21 Claims, 4 Drawing Sheets

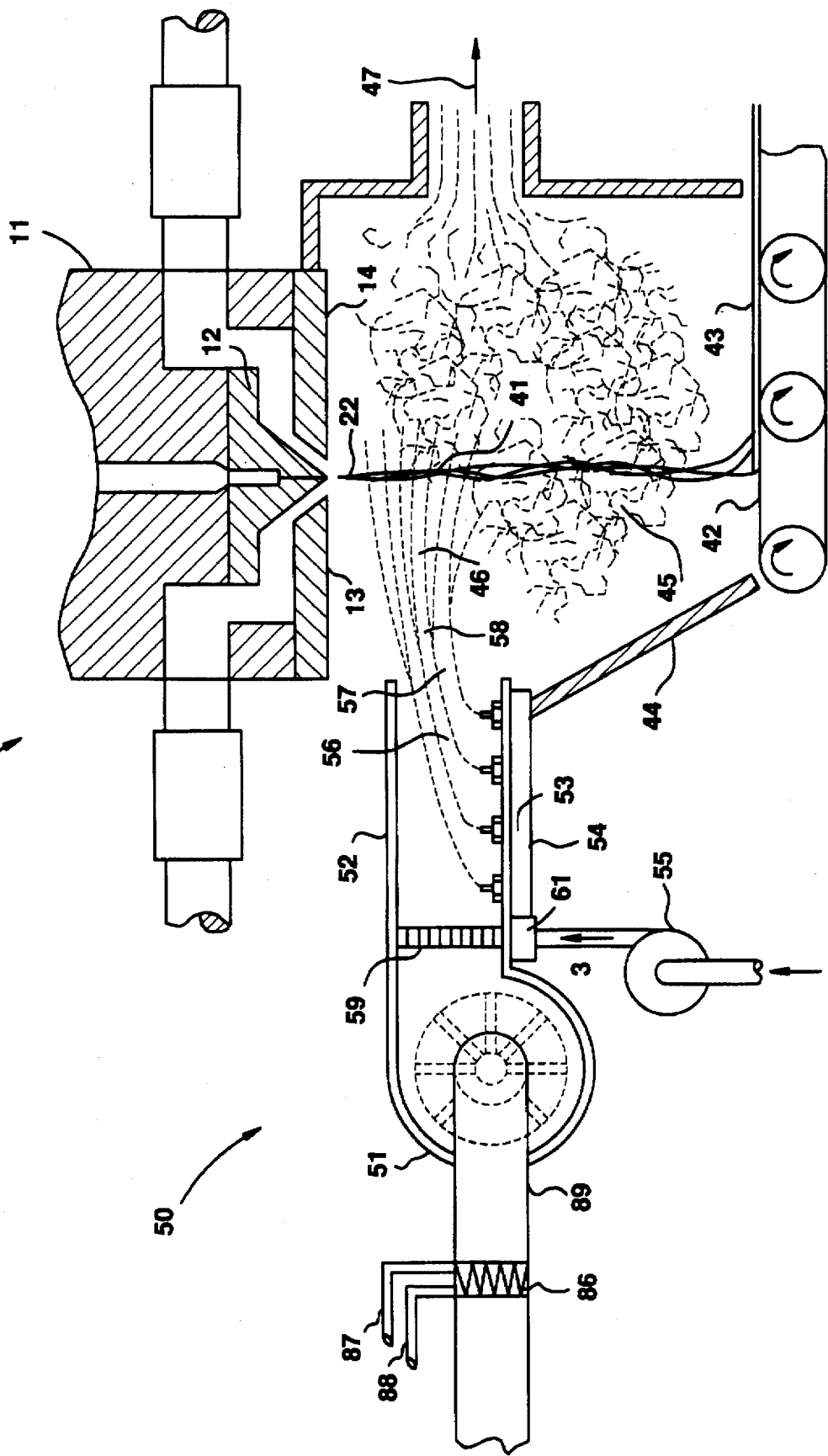

AIRLESS QUENCH METHOD AND APPARATUS FOR MELTBLOWING

BACKGROUND OF THE INVENTION

This invention relates to the meltblowing of thermoplastic materials to produce nonwoven fibrous fabrics. In particular the invention relates to an improved airless water quenching system for rapidly cooling the extruded fibers of the fabric.

Meltblowing is a process wherein a molten thermoplastic material is extruded through a meltblowing die to form a plurality of side-by-side molten fibers. Convergent jets of heated air are directed onto opposite sides of the extruded fibers to attenuate the fiber diameters by stretching the fibers. The air jets and fibers form a fiber and air stream which is directed onto a moving collector surface where the fibers randomly deposit to form a nonwoven fabric or web. The web is held together primarily by fiber entanglement with some fiber-to-fiber sticking while still in the molten or semi-molten state. Nonwoven webs so produced have a number of commercial uses including medical products and filters, absorbents, and battery separators to name a few.

Efforts to improve the economics of the meltblowing process have focused on increasing the web production rate (polymer throughput) without compromising the final properties of the web, as well as adding significantly to the production costs. Important mechanical properties of the web include strength, stretchability, and absorbency. Equally important in some applications are the fabric-like properties of hand and drape. In the past it has been found that simply increasing the polymer throughput in the die led to the formation of polymer agglomerations known as "shot". The shot forms in the fiber and air stream because the increased polymer throughput results in larger diameter fibers which do not have sufficient time to cool and solidify into individual fibers before fusing with adjacent fibers, whereby the fibers tend to agglomerate. The formulation of shot degrades virtually all of the desirable properties of nonwoven webs. High quality meltblown webs are held together by gross mechanical entanglement with only a small amount, if any, of interfiber fusion or sticking.

It is known in the art of meltblowing to apply a quenching fluid to the molten fibers shortly after leaving the die to rapidly cool and solidify the fibers, whereby adjacent fibers do not agglomerate and form shot. The use of a quenching fluid permits a higher polymer throughput while avoiding the problem of shot formation and fabric degradation.

An equally important aspect of quenching is the effect on web properties. It has been shown experimentally that the application of quenching may significantly improve the web properties such as hand, stretchability, and tear strength. This is true even in situations where shot formation is not a problem as in fine fibers. Meltblown fabrics having fine fibers are important in medical and filtration applications. Quenching alters the web properties by influencing the polymer fiber crystallization and solidification rates. Quenching also minimizes interfiber fusion so that the fabric is held together almost exclusively by fiber entanglement.

U.S. Pat. No. 3,959,421 discloses a conventional meltblowing die and collector apparatus with water spray nozzles positioned therebetween. The nozzles are air-driven nozzles which use compressed air to break up, or atomize, liquid water to produce a spray of water droplets. The droplets are directed onto opposite sides of the extruded fibers at a position upstream of that where shot would form in an otherwise unquenched process. The water droplets cool the fibers primarily through evaporative cooling wherein the liquid water droplets are vaporized, thereby removing the latent heat of vaporization from the fibers. The Patent discloses that the application of quenching fluid allows a production rate of up to about 3.0 lb/hr/in. The production rate is limited by the maximum allowable quench water rate with-out the formation of what is referred to as a "wet" web. A wet web is one which has liquid water entrapped within voids in the fabric. The Patent further discloses experimental data for polypropylene which shows a significant improvement in web properties when quenching is applied.

U.S. Pat. No. 4,594,202 discloses the use of air-driven water atomizer nozzles for use in producing tubular meltblowns having fiber diameters in excess of 2.5 microns.

From the foregoing it is apparent that improvements in the application of an evaporative quenching are important for improving the economics of the meltblowing process as a whole, both from the standpoint of eliminating shot at high production rates, as well as improving web properties over a range of production rates.

A problem encountered in prior art water quenching nozzles is associated with the use of air-driven nozzles to atomize the liquid water into droplets. This type of nozzle requires both a source of compressed air and a source of liquid water which must be metered out in precise volumetric relation to achieve a uniform spray at the desired rate. In longer dies, this approach may require the use of numerous nozzles which in general must each be adjusted and metered independently. For example, the use of thirty nozzles may require the metering of nearly sixty flow lines, one water, and one air for each nozzle. Air operated nozzles also tend to form relatively large water droplets. Moreover, the droplet size of the air or atomized spray is much larger than that used in the present invention. For example, air atomized nozzles produce droplets ranging in size from about 20 to about 60 microns. The inertia of the larger droplets presents problems of disrupting the polymer filament pattern from the die to the collector.

It is an object of the present invention to provide a simplified quenching apparatus which provides exceptional fiber cooling when applied to meltblowing.

SUMMARY OF THE INVENTION

The present invention provides a novel quenching system which makes use of an airless nozzle for atomizing liquid water to produce a fog which may be used to evporatively quench meltblown fibers. The present quench apparatus may be used with most any meltblowing die for producing meltblown fabrics, webs, mats, and tubes which are free of shot and have excellent hand and strength. The quench apparatus comprises a plurality of airless nozzles capable of generating microsized droplets of water and means for transporting the water droplets into contact with the meltblown fibers.

Each airless nozzle comprises a plate having a tiny orifice formed therein, an impact pin positioned in front of but spaced from the orifice, and means for delivering pressurized water through the orifice whereby a water stream impacts the pin and breaks the stream into microsized droplets. The fog thus produced is delivered into contact and cool the extruded fibers at a location between the die and the collector.

In operation, the airless nozzle of the present invention requires only a source of pressurized water, and does not require a source of compressed air. Therefore, the water need not be metered out in relation to a second stream of compressed air as in prior art air-driven nozzles as applied to meltblowing. The elimination of the compressed air source is advantageous economically as well since the compression of large amounts of air, as in air-driven nozzles, may require a significant amount of energy and operation cost. Also, the air used in prior art air atomizer nozzles may cause fiber disruption and fiber stripping which are avoided with the present airless system. The airless feature of the present nozzle thus simplifies, economizes, and generally improves the application of a quenching fluid for use in meltblowing.

The discharge from the present airless nozzle is sensitive only to the water pressure at the nozzle inlet. It has been found that a plurality of the nozzles may be installed along a feedwater manifold and the pressure in the manifold controlled using a small pump. In this way a large number of airless nozzles may be operated in parallel without the need to meter and control each nozzle separately. In fact, the operation of the present nozzles requires no adjustments other than the manifold pressure which is easily maintained using the pump. The airless nozzles of the present invention have been shown to provide exceptional evaporative quenching when applied to meltblown fibers.

A particular advantageous feature of the present invention is that it cools the meltblown fibers with microsized water droplets (e.g. 10 microns) which are much smaller than the droplets produced by air atomized nozzles. Small droplets are advantageous from a heat transfer standpoint as well as avoiding fiber disruption due to droplet inertia.

The microsized water droplets (e.g. fog) may be delivered into contact with the meltblown fibers by a low velocity fan which is fed by air at ambient temperature. Alternatively, the fan may be positioned to pull the droplets and ambient air past the fibers.

In a preferred embodiment, the fan will be fed by pre-cooled or chilled air so that air below ambient temperature will cool and carry the fog droplets into contact with the meltblown fibers.

In another preferred embodiment, the means for delivering the fog into contact with the fibers is the natural aspirating effect of the fiber and air stream of the meltblowing process. In this case the present airless nozzles are simply positioned adjacent to the extruded fibers without the need for a fan.

The use of the present airless quenching invention results in increased throughput by at least 50%, preferably at least 60%, and most preferably by at least 80% over that attainable without quenching. Maximum throughput is determined by the onset of unacceptable levels of shot and/or "fly" (i.e. meltblown debris or particles in the meltblowing area).

BRIEF DESCRIPTION OF THE DRAWINGS

FIG. 4 is a sectional side view of the quench apparatus for filling an enclosure with quench fog.

MELTBLOWING DIE

Figure 1:
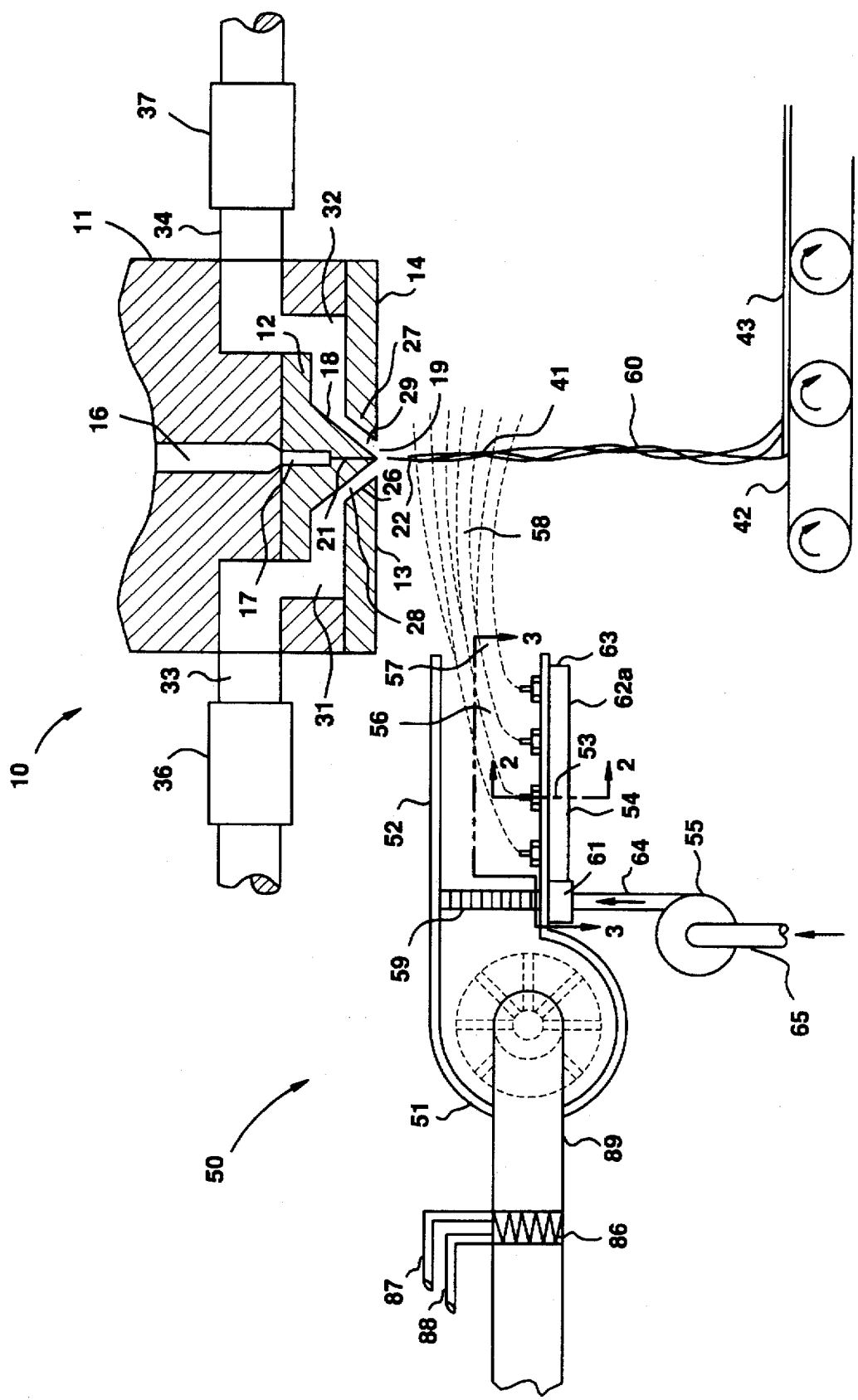
FIG. 1 is a sectional side view of a meltblowing die and the water quench apparatus of the present invention.

Referring to FIG. 1, meltblowing die 10 comprises body 11 having secured thereto die tip 12 and flanking air plates 13 and 14. The design of die 10 may be in accordance with U.S. Pat. No. 5,145,689, the disclosure of which is incorporated herein by reference. As will be understood to those of skill in the art, the present quench apparatus may be used in combination with most any type of meltblowing die, and therefore, the description of die 10 is for illustration only and is in no way intended to limit the scope of the present invention.

Die body 11 has formed therein central polymer flow passage 16 for delivering a pressurized molten polymer to die tip inlet passage 17. Die tip 12 has triangular nosepiece 18 terminating in apex 19. A plurality of orifices 21 are drilled through the apex into polymer passage 17. The orifice will generally have a diameter of between 10 to 30 mils (microns) and are spaced along the nosepiece apex at between 20 to 30 orifices per inch, depending on the operating conditions. The overall length of most commercial dies 10 will usually be between 12 to 60 inches, although longer dies can be used. Pressurized molten polymer flows through body passage 16 into tip passage 17 which in turn feeds orifices 21. The pressurized polymer is extruded through the orifices to form a plurality of molten or semi-molten fibers 22 which leave the die at apex 19. The pressurized molten polymer is delivered to die body passage 16 from an extruder (not shown).

Air plates 13 and 14 have tapered edges 26 and 27, respectively, and in combination with nosepiece 18 define converging flow passages 28 and 29. The positioning of plates relative to the nosepiece is determined by two dimensions usually referred to as the "air gap" and the "setback". Passages 28 and 29 are elongate passages extending substantially the full length of the die. Die body 11 has formed there in passages 31 and 32 connected to passages 28 and 29, respectively. Air is delivered to body 11 through inlet lines 33 and 34. The air flows through passages 31 and 32, into converging passages 28 and 29, and is discharged therefrom as converging sheets of air which converge at nosepiece apex 19. The air, referred to as "primary air", is heated to the meltblowing temperature (approximately 520° F.) using in-line heaters 36 and 37 (e.g. electric heaters or gas furnaces).

The convergent air sheets impart an aerodynamic drag force acting away from the die which draws down and attenuates the diameter of the molten or semi-molten extruded fibers 22. The final fiber diameter generally ranges from between 0.5 to 15 microns depending on the process conditions. The fiber attenuation is an important step in producing fabrics having good hand and other properties such as strength and absorbency. The primary air entrains the extruded fibers to form a fiber and air stream 41 which is directed onto moving collector surface 42. The fibers deposit on the collector surface in a random way and form nonwoven fabric or web 43. The web is withdrawn from the collector for winding (not shown). The web is held together by gross fiber entanglement which occurs primarily in the fiber and air stream 41 wherein turbulence induces interfiber entanglement. It is preferred that the fibers be substantially solidified before being deposited onto the collector. If the fibers are molten, or even semi-molten, they may fuse together or stick to the collector and adversely affect the quality of the web.

The application of an airless water quenching system to extruded fibers 22 is described below. The purpose of the quenching is threefold. First, it may be employed to eliminate shot formation at high web production rates by speeding fiber solidification. Second, it is very effective in producing webs of having exceptionally good hand and tear strength for fine fiber applications such as medical and filtration applications. Third, the rapid cooling prevents the fibers from sticking to the collector. The quenching system as a whole is described first followed by a detailed description of the airless nozzle used in the system.

Water Quench System

Referring again to FIG. 1, quench apparatus 50 comprises fan 51 having discharge duct 52, airless atomizer nozzles 53 in fluid communication with water manifold 54, and water pump 55. Airless nozzles 53 are disposed inside duct 52 and discharge water fog 56 therein. Fan 51 delivers a stream of air through duct 52 which entrains and carries the fog out of the duct through exit 57 as droplet laden air/fog quench stream 58. The quench stream 58 is directed onto extruded fibers 22 upstream of the point (illustrated as 60) where shot would otherwise occur in the absence of quenching.

Figure 3:
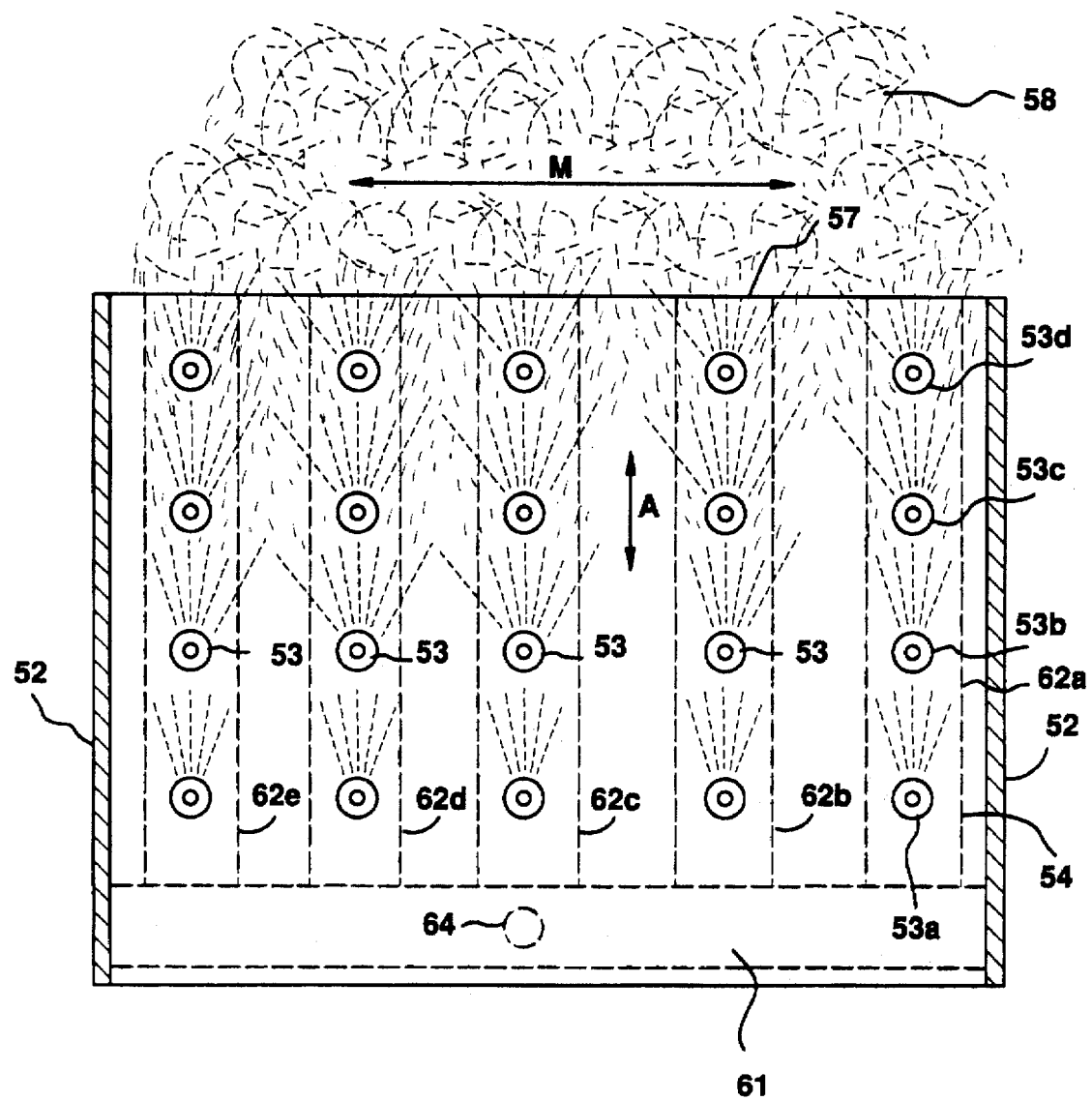
FIG. 3 is an elevational view of the water manifold and airless nozzles of the present invention, from the perspective of the plane indicated by line 3—3 of FIG. 1.

As best seen in FIGS. 1 and 3, a number of airless nozzles 53 are mounted on water manifold 54 and disposed to discharge into fan duct 52. Nozzles 53 are distributed over the length (arrow A) and width (M) of the duct to provide a uniform fog density therein. Manifold 54 comprises header 61 connected to multiple feed tubing sections 62a–e. The header and tubing sections may be constructed from stainless steel or copper tubing stock and connected by welding. The tubing sections are closed at ends 63 by attaching a cap to the tubing. Pump 55 delivers pressurized water via line 64 to header 61 which distributes the water in parallel to the feed tubing 62a–e. The tubings feed airless nozzles 53 which discharge in parallel into fan duct 52 for forming quench stream 58 and quenching extruded fibers 22. Baffle 59 induces turbulence in duct 52 which induces mixing of fog from adjacent nozzles. Pump 55 is fed by inlet line 65 which may be connected to a civic water supply or other source. Other designs of manifold 54 and the array of nozzles 53 are obviously possible without departing from the inventive theme of an airless quenching system. For example, downwardly facing nozzles 53 with manifold 54 may be mounted on the upper wall of duct 52 so that fog is discharged into the air from above and below.

Also, an exhaust fan may be provided in the room or workspace housing the meltblowing equipment and positioned to draw the fog stream 58 through the duct 52 into contact with the meltblown fibers and thereby effect cooling and quenching. In this embodiment, the fan 51 would not be essential.

Quench stream 58 is generally at or near the ambient room temperature (e.g. approximately 70° F.), whereas fibers 22 are discharged at an elevated temperature near 500° F. The quench fog stream 58 comprises an enormous number of microsized liquid water droplets which are vaporized upon contacting the fibers 22 as well as the primary air since both the fibers and primary air are well above the boiling point temperature of the water. As the droplets vaporize they remove the latent heat of vaporization from the fibers by the process of evaporative cooling. The evaporative cooling is very effective due to the large number of droplets and the large latent heat of vaporization of water.

It should be pointed out that fog stream 58 is directed, not onto fibers 22 only, but onto the primary air stream as well which is also at an elevated temperature (approximately 520° F.). Therefore, the quench stream 58 simultaneously cools both fibers 22 and the primary air of the fiber and air stream. By removing heat from the primary air, the temperature of the primary air surrounding the fibers decreases and, as a consequence, there is convection heat transfer from the fibers to the cooled primary air. Thus, extruded fibers 22 are cooled in two ways: (i) by direct evaporative cooling to the water droplets of the quench stream, and (ii) by convective heat transfer to the primary air stream which itself has been evaporatively cooled by the quench stream.

The velocity of the fog stream 58 is very small in comparison to that of fiber and air stream 41, and while stream 58 does induce a small amount of cross flow, it does not in any way disrupt or adversely influence the fiber entanglement. In fact, the cross flow may actually be beneficial in promoting additional fiber entanglement.

Although FIG. 1 illustrates a single quench stream directed onto one side of the fiber and air stream, it is also possible to simultaneously employ a second stream directed onto the opposite side. The use of a single stream has been shown to be adequate for most applications. However, a second stream may be preferred in situations where a very high polymer throughput (course fibers) is needed.

Airless Atomizer Nozzles

An important advantage of the present invention is the use of the airless atomizing nozzles 53 which require only a source of pressurized water, thereby eliminating the need for a compressed air source as in air-driven atomizer nozzles of the prior art. As has been mentioned, the operation of air-driven nozzles as applied to meltblowing requires that an air flow and water flow be simultaneously metered through the nozzle in precise volumetric relation to produce a fog having the desired properties. The configuration and operation of the present airless atomizing nozzles simplifies the application of a quenching water fog as will be described in detail below. The term "fog" herein refers to a large number of finely divided microsized liquid water droplets.

Figure 2:
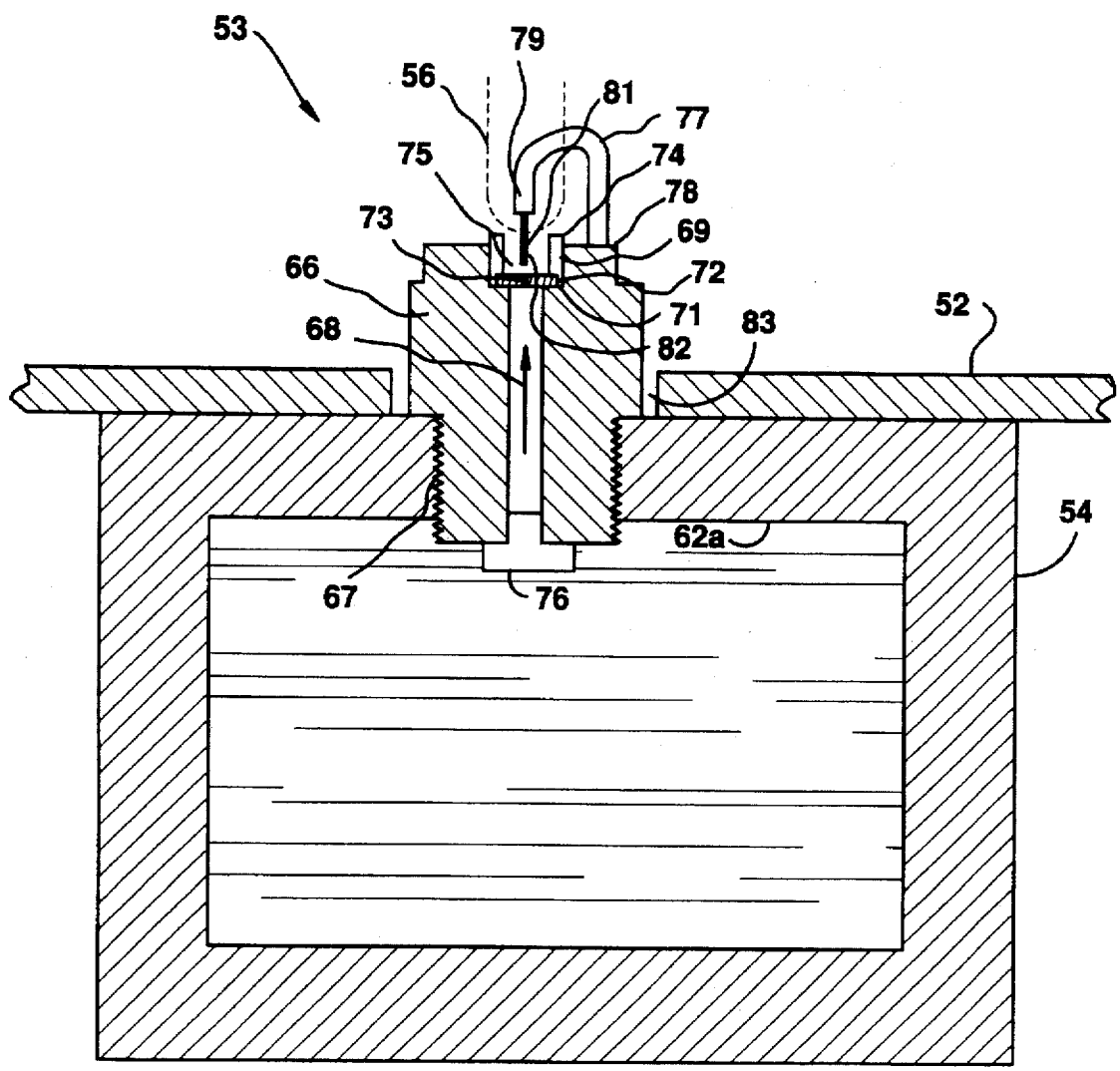
FIG. 2 is a sectional view of the airless water nozzle useable in the present invention with the cutting plane taken along line 2—2 of FIG. 1.

Referring to FIG. 2, airless nozzle 53 comprises a cylindrical body 66 having a threaded end 67, central flow passage 68, and cavity 69 with shoulder surface 71. Threaded end 67 is threaded into feed tubing 62a of manifold 54 for securing the nozzle in fluid communication therewith. Nozzle 53 further comprises orifice plate 72 having drilled therethrough orifice 73 with outlet 75. Plate 72 is secured to body 66 by compression ring 74 which compresses the plate onto body shoulder 71. Body 66 and retaining ring 74 are preferably constructed from high quality steel, and plate 72 is preferably constructed from ruby crystal. The use of ruby crystal provides excellent wear of orifice 73 over the life of the nozzle. Pressurized water in feed tubing 62a flows through central passage 68, through orifice 73, and is discharged from outlet 75 as a small circular (cross section) stream of liquid water. Filter 76 may be provided at the inlet to passage 68 for removing particulate which may clog the orifice.

Nozzle 53 further comprises J-shaped member 77 secured to the nozzle body at end 78 with impactor pin 81 secured to opposite end 79. Impact end 82 of the impactor 81 pin is positioned over and in alignment with orifice outlet 75. The water stream discharging from outlet 75 impacts upon pin end 82 whereby the stream is broken up, or atomized, into a fog of finely divided liquid droplets 56. The outward momentum of the droplets carries the droplets away from the nozzle as a fog 56. Nozzle 53 is disposed in fan duct 52 through opening 83 so that fog 56 is discharged into the duct. Manifold 54 may be secured to duct 52 for sealing opening 83 by any variety of methods such as bolts or welding.

The preferred nozzles are ruby orifice nozzles manufactured by Atomizing Systems, Inc. of Ho-Ho-Kus, NJ 07423-1433. The flow rate through each nozzle is approximately 0.02 gpm and the average water droplet size is about 10 microns. The nozzles are designed to run at inlet pressures in the range of 200 to 1200 psi. In these nozzles, the diameter of orifice 73 is 0.004 to 0.006 inches and the diameter of impactor pin 81 is 0.004 to 0.006 inches. The positioning of pin 81 over orifice 73 is critical for producing a fog of uniform droplet size. These nozzles have been marketed primarily for use in odor control. The lower end of pin 81 may be from 0.004 to 0.006 inches from the outlet 75 of ruby 72.

With reference to FIG. 3 it is seen that a total of twenty ruby orifice nozzles are illustrated, with a row of four nozzles (designated 53a–d) positioned along the length of each of the five feed tubing sections 62a–e. The number of nozzles 53 shown is by way of illustration only as the actual number of nozzles will vary depending on the application. The direction of arrow A is henceforth referred to as the air flow direction, and the direction perpendicular to the air flow is referred to as the machine direction indicated by arrow M. FIG. 3 illustrates the use of five feed tubing sections with four nozzles 53 in the air flow direction and five nozzles 53 in the machine direction. The number of nozzles in the air flow direction may vary depending on the application, with from 1 to 10 nozzles being preferred and 2 to 6 most preferred. The number of nozzles in the machine direction will vary depending on the length of die 10 with between 1 to 10 nozzles being preferred for each meter of die length. The spacing between nozzles 53 will be adjusted to provide a uniform fog 58 of desired amount. Spacing from 2 to 10 inches may be used.

The dimensions of duct 52 are not critical. The duct should be wide enough in the machine direction to deliver a quench stream uniformly over the full die length. For the preferred nozzle configurations above, the length of duct 52 in the air flow direction should be such that the nozzles may be conveniently disposed within the duct, and long enough so that the discharge from adjacent nozzles have time to mix. The height of duct 52 should be as small as possible, but large enough so that substantially all of fog 56 is entrained by the air flow and does not deposit on the upper wall of the duct. A height of 2 to 12 inches should be adequate. The exit of duct 52 should preferably be from between 1 to 12 inches, preferably 1 to 8 inches, from the die exit, and between 2 to 12 inches, preferably 2 to 8 inches, from the extruded fiber stream. The preferred air flow rate through duct 52 will generally be in the range of 1,000 to 15,000 scfm per meter of duct in the machine direction.

It is important to note from the above data that the flow rate through each of nozzles 53 is very small in relation to the total volume of manifold 54, and therefore, the pressure inside the manifold is substantially uniform over each of feed tubings 62a–e. As a result, the flow rate and droplet size discharged from each nozzle (twenty nozzles as illustrated in FIG. 3) is approximately the same. This feature of the present invention results in a quenching stream 58 which is uniform over the length of the die 10. Baffle 59 also acts to distribute the air flow and fog uniformly throughout the duct.

From an operational standpoint the present invention represents a significant simplification over air-driven quenching nozzles of the prior art. All that is required to operate the present system is to adjust the speed or size of pump 55 to provide the desired operating pressure in manifold 54 at the required water flow rate. Pumps and electronic controls for this purpose are available from a large number of vendors.

The uniformity of the quench stream 58 and the very effective and rapid cooling of fibers 22 permit high polymer throughput and web production rate while eliminating the formation of shot. For processing polypropylene for a given minimum fiber size the maximum allowable polymer throughput without the application of quench stream 58 is about 0.42 gms/hole/min. This limit increases to approximately 0.85 gms/hole/min after the present quench apparatus has been activated for applying quench stream 58. As has been mentioned, even higher throughput (up to 80% increase) may be achieved by using two quench apparatus 50 applied to opposite sides of the extruded fibers.

In addition to higher web production rates, the use of the present airless quench apparatus results in fine fiber webs with exceptional hand and strength.

The quenching apparatus described above represents a preferred embodiment. The invention, however, contemplates variations thereof. For example, the airless nozzles 53 mounted on a manifold 54 may simply be positioned adjacent the fiber and air stream 41 extruded from the die 10. The aspirating effect of the meltblowing process will draw the fog generated by nozzles 53 into contact with the fibers 22.

FIG. 4 illustrates another embodiment of the present invention wherein rather than applying a quench stream to the fiber and air stream directly, the quench apparatus 50 is used to substantially fill a workspace enclosure with a quenching fog. This configuration may be desirable in situations where it is necessary to confine and control the quench fog for, perhaps, corrosion prevention to surrounding devices. Enclosure 44 defines workspace 45 having fan duct 52 discharging therein to substantially fill the workspace with quench fog 46. Fiber and air stream 41 passes through fog 46 and is evaporatively cooled thereby as has been described. Exhaust opening 47 provides an outlet for fog 46 being displaced and replenished by new quench fog entering the workspace from duct 52. A variation of the closed system shown in FIG. 4 is that the fan 51 may be located in exhaust opening 47, in which case the inlet to duct 52 could be open to the ambient.

The present airless quenching apparatus may be used for processing any of the thermoplastic materials normally used in meltblowing. The preferred polymer is polypropylene. However, other materials include low and high density polyethylene, ethylene, copolymers (including EVA copolymer), nylon, polyamide, polyesters, polystyrene, poly-4-methylpentene, polymethylmethacrylate, polytrifluorochloroethylene, polyurethanes, polycarbonates, silicones, and blends of these. The quench water rate and number of nozzles may vary from material to material.

Precooling Embodiment

FIG. 1 illustrates another embodiment wherein the suction of fan 51 is fed with precooled air through suction duct 89. A cooling coil 86 is positioned in duct 89 and serves to cool the air fed to fan 51 by at least 5° F., preferably at least 10° F., and most preferably at least 15° F. The preferred cooling range is 5° to 20° F., preferably 10° to 20° F., and most preferably 15° to 20° F.

Any cooling system such as an air conditioning cycle fed by lines 87 and 88 may be used. Alternatively, evaporative cooling may be used at this point to precool the air. A simple air conditioning unit is preferred. The type and size is well within the skill of the art to achieve the desired cooling.

EXAMPLES

A conventional meltblowing die was equipped with the cooling system according to the present invention and tested. The equipment, polymers, and test conditions were as follows:

| Die | |
|---|---|
| Length | 44" |
| Orifices per inch | 30 |
| Orifice size (mils) | 15 |
| Operating Conditions | |
| Die | 510° F. |
| Primary air | 510° F. |
| Air gap | 0.060 mils |
| Setback | 0.060 mils |
| Die to collector | 26.25 inches |
| Polymer throughput | 0.78 gms/orifice/min |
| Primary air rate | 15 SCFM |
| Polymer | PP 800 FR |
| Cooling System | |
| No. of nozzles | 30 |
| Type CF-006/2 | 0.006" (mfd. by Atomizing Systems Inc.) |
| Duct Width | 44.08" |
| Nozzle spacing | 1.52 inches |
| Total water rate | 0.14 GPM |
| Nozzle distance from die center line | 6" |
| Nozzle distance below die | 2" |
| Temp. of fog | 62° F. (100% relative humidity) |

(No fan was used. The aspirating effect of the meltblowing process caused the fog to contact the fibers.)

The first test was run without water quench. The results were as follows: Polymer throughput was only 0.42 grams/orifice/minute.

The second runs were carried out using prior art air-driven nozzles. The maximum attainable polymer flow rate was 0.55 grams/orifice/minute.

The third test using the present airless fog nozzles as described above resulted in a maximum flow rate of 0.78 grams/orifice/minute. Higher rates are possible when using a fan to propel the droplets into contact with the fibers as has been described in relation to FIGS. 1, 3, and 4.

Although the reasons for the improved results are not fully understood, it is believed that two characteristics of the airless fogging nozzles are involved: (1) the small particle size of the airless droplets, and (2) the absence of large volumes of air. The airless nozzles produce droplets having the following size distribution:

| Percentage of Droplets | Droplet Size |
|---|---|
| 0–40% | Less than 15 microns |
| 0–60% | Less than 20 microns |
| 0–100% | 3 to 60 microns |
| Avg. | Less than 20 microns (5 to 19 microns), preferably less than 15 microns (5 to 14), most preferably less than 10 microns (5 to 9 microns) |

The small droplet size presents much more surface area for the cooling. Moreover, their low mass results in low inertia which will not disrupt fiber flow pattern to the collector. Droplet sizes for prior art air-driven nozzles are typically between 20 to 60 microns.

The term "airless" nozzle used herein is used to distinguish over air atomizer nozzles used in the prior art cooling systems. In the air atomizers large controlled volumes of high velocity air are required to break up the water to form the droplets. The large volume of air creates turbulence which could disrupt the fiber flow pattern. In the system used in the present invention, air is not used to break up the water, but low velocity air may be used to convey the droplets to the meltblown fibers.

What is claimed is:

1. An apparatus for meltblowing thermoplastic materials, comprising:
   (a) a meltblowing die for extruding a thermoplastic to produce a plurality of side-by-side molten or semi-molten fibers;
   (b) a collector surface whereupon the extruded fibers deposit to form a nonwoven web;
   (c) a plurality of airless nozzles, each nozzle comprising (i) a plate having an orifice formed therein, (ii) an impact pin positioned opposite the orifice, and (iii) means for delivering pressurized water to the nozzles whereby water flows through each nozzle and impacts on the impact pin breaking the water into microsized droplets forming a fog; and
   (d) means for delivering the fog into contact with the fibers.

2. The apparatus of claim 1 wherein the means for delivering the fog into contact with the fibers comprises an aspirated air flow created by the fibers and air stream of the meltblown process.

3. The apparatus of claim 1 wherein the plate is a ruby and the orifice therein ranges in size from 0.002 to 0.008 inch.

4. The apparatus of claim 1 wherein the orifice size ranges from 0.004 to 0.006 inch.

5. The apparatus of claim 1 wherein the airless nozzles produce water droplets having an average diameter less than 20 microns.

6. The apparatus of claim 5 wherein the airless nozzles produce water droplets less than 15 microns.

7. The apparatus of claim 1 wherein the means for delivering the fog into contact with the fibers comprise a fan for blowing air into the fog to transport the fog and air into contact with the fibers.

8. The apparatus of claim 1 wherein the means for delivering the fog into contact with the fibers comprises a fan for drawing the air and fog into contact with the fibers.

9. The apparatus of claim 1 wherein the nozzles are positioned on one side of the extruded fibers and the means for delivering the fog into contact with the fibers comprise a fan feeding an outlet duct surrounding the nozzles and discharging onto the fibers, an inlet duct feeding air to the fan, and means positioned in the inlet duct for cooling air passing therethrough.

10. The apparatus of claim 9 wherein the means for cooling the air in the inlet duct is an air conditioner coil.

11. The apparatus of claim 1 wherein the means for delivering water to each nozzle comprise a water manifold for feeding each nozzle in parallel, and means for delivering water to the manifold at a selected pressure.

12. A method for cooling thermoplastic fibers discharged from a meltblowing die onto a collector, the improvement comprising contacting the fibers at a location between the discharge and collector with a fog of microsized water droplets generated by airless nozzles.

13. The method of claim 12 wherein the droplets have an average size of less than 20 microns.

14. The method of claim 12 wherein the airless nozzles are airless ruby nozzles.

15. The method of claim 12 wherein the thermoplastic fibers are contacted by generating the fog at a position adjacent the fibers and blowing the fog with a stream of air into the before the fibers have cooled substantially thereby effecting rapid cooling of the fibers.

16. The method of claim 15 wherein the fog has a temperature of 10° F. below the air used to blow the fog into the fibers.

17. The method of claim 16 wherein the air blown into the fog is precooled to a temperature at least 5° F. below ambient air.

18. An apparatus for cooling meltblown thermoplastic fibers extruded from a meltblown die as a row of side-by-side fibers, and collected on a moving collector to form a nonwoven web, said apparatus comprising:

(a) a duct having an outlet positioned adjacent to the row of fibers and directed thereat, and an inlet;

(b) a row of airless nozzles mounted in the duct and extending parallel to the row of fibers, said nozzles generating a fog having a droplet size less than 20 microns; and (c) a fan for delivering air to the inlet to contact the fog and discharge an air/fog mixture from the duct outlet into contact with the row of fibers.

19. The apparatus of claim 18 further comprising a housing for surrounding and isolating the fog and fibers.

20. The apparatus of claim 18 wherein the fan is connected to the inlet of the duct and further comprises a feed duct for conducting air to the fan, and means mounted in the feed duct for cooling the air passing therethrough.

21. The apparatus of claim 18 wherein the duct outlet is positioned within 2 to 12 inches from the row of fibers and within 1 to 12 inches from the die outlet.

* * * * *